US008588747B2

(12) United States Patent
Tanioka

(10) Patent No.: US 8,588,747 B2
(45) Date of Patent: Nov. 19, 2013

(54) METHOD AND APPARATUS FOR IMPROVING COMPUTING DEVICE SECURITY

(75) Inventor: Hideaki Tanioka, San Jose, CA (US)

(73) Assignee: Fujitsu Limited, Kawasaki-shi (JP)

( * ) Notice: Subject to any disclaimer, the term of this patent is extended or adjusted under 35 U.S.C. 154(b) by 17 days.

(21) Appl. No.: 13/096,274

(22) Filed: Apr. 28, 2011

(65) Prior Publication Data

US 2012/0276871 A1    Nov. 1, 2012

(51) Int. Cl.
*H04M 1/66* (2006.01)

(52) U.S. Cl.
USPC ........ 455/411; 455/410; 455/407; 455/456.6; 455/425

(58) Field of Classification Search
USPC ............ 455/411, 556.1, 407, 410, 412.1, 425
See application file for complete search history.

(56) References Cited

U.S. PATENT DOCUMENTS

| | | | | |
|---|---|---|---|---|
| 2005/0274796 A1* | 12/2005 | Miyashita | ...................... | 235/382 |
| 2008/0220744 A1* | 9/2008 | Rydgren et al. | .............. | 455/411 |
| 2009/0312051 A1* | 12/2009 | Hansson et al. | ........... | 455/556.1 |
| 2010/0138666 A1* | 6/2010 | Adams et al. | ................. | 713/186 |
| 2011/0086615 A1* | 4/2011 | Golder | .......................... | 455/411 |
| 2011/0128119 A1* | 6/2011 | Rao | ................................ | 340/5.6 |
| 2011/0237220 A1* | 9/2011 | Matsuoka | ...................... | 455/411 |
| 2012/0084734 A1* | 4/2012 | Wilairat | ........................ | 715/863 |

OTHER PUBLICATIONS

Innovating Haptic Solutions; "*haptictouch technology: revolutionary. transformative. now;*" http://www.pacinian.com/technology; copyright 2009 Pacinian Corp.; one page, 2009.
Immersion Corporation; "*Haptics for the Digital User Experience;*" http://www.immersion.com; Copyright 2011; one page, 2011, (printed on Apr. 25, 2011).
"*Toshiba brings texture to touch (video);*" http://www.engadget.com/ 2010/05/21/toshiba-brings-texture-to-touch . . . ; one page, May 21, 2010.

* cited by examiner

*Primary Examiner* — David Q Nguyen
(74) *Attorney, Agent, or Firm* — Baker Botts L.L.P.

(57) ABSTRACT

According to one embodiment, a computing device is provided that includes a memory and a processor. The memory may be operable to store a plurality of codes. The processor may be operable to associate each code with a corresponding haptic signal. The processor may further be operable to receive a request to unlock the computing device. The processor may further be operable to select one of the plurality of codes, and generate the corresponding haptic signal associated with the selected code.

22 Claims, 3 Drawing Sheets

METHOD AND APPARATUS FOR IMPROVING COMPUTING DEVICE SECURITY

TECHNICAL FIELD OF THE INVENTION

This invention relates generally to mobile computing devices, and more particularly to a method of associating haptic signals with codes to unlock a mobile computing device.

BACKGROUND OF THE INVENTION

Cell phones, particularly smart phones, are becoming more ubiquitous and versatile. As demand grew, cell phones design also grew to support more security features, such as a lock. When a user is not using the cell phone, the user may lock the phone to prevent others from having full access to all its features and information. When the user wishes to use the cell phone, the user may unlock the phone by entering a code.

However, it may not always be safe for the user to unlock the phone. For example, other people may be looking at the user to steal the code as the user enters it. Furthermore, the user may leave prints or smudges that another person could use to steal the code.

SUMMARY OF THE INVENTION

According to another embodiment, a method for improving security for a mobile computing device may begin by storing a plurality of codes in the mobile computing device and associating, by the mobile computing device, each code with a corresponding haptic signal. The method continues by receiving, at the mobile computing device, a request to unlock the mobile computing device. The method further includes selecting, by the mobile computing device, one of the plurality of codes, and generating, by the mobile computing device, the corresponding haptic signal associated with the selected code.

According to yet another embodiment, a computing device is provided that includes a memory and a processor. The memory may be operable to store a plurality of codes. The processor may be operable to associate each code with a corresponding haptic signal. The processor may further be operable to receive a request to unlock the computing device. The processor may further be operable to select one of the plurality of codes, and to generate the corresponding haptic signal associated with the selected code.

Technical advantages of certain embodiments of the present disclosure include providing enhanced security in the unlock process of mobile communication devices. Specifically, a person who steals a user's code to unlock the mobile communication will not be able to unlock the mobile communication device because the person will not be able to steal the corresponding haptic signal associated with the code. Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1A:
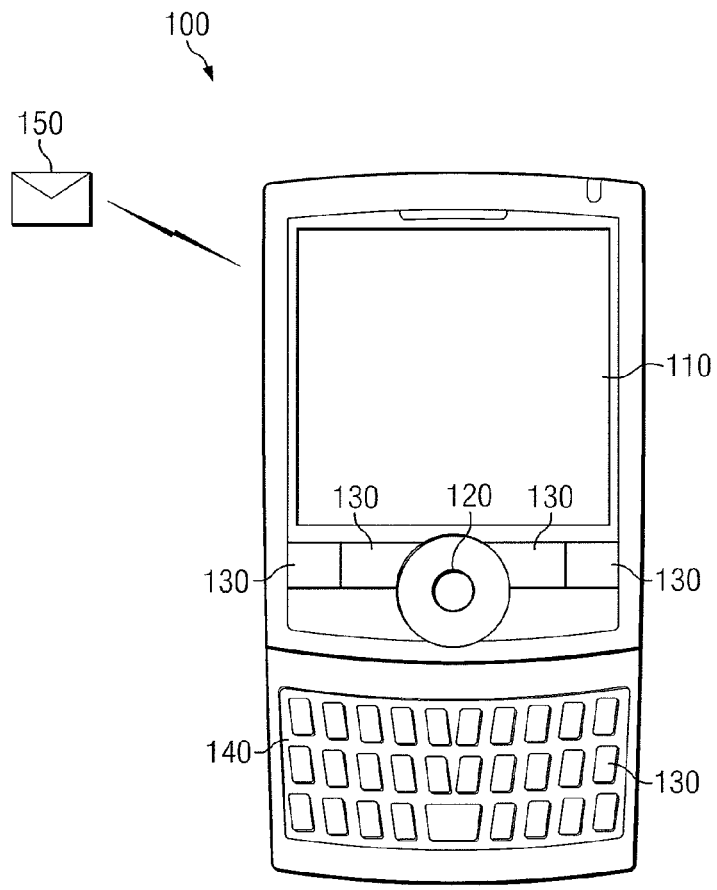
FIG. 1A is a schematic diagram of a computing device.

FIG. 1A is a schematic diagram of a computing device 100. In particular embodiments, computing device 100 may be a mobile computing device. As an example, and not by way of limitation, computing device 100 may be a mobile phone, smart phone, laptop, pager, or any other suitable mobile computing device. Computing device 100 may include a display 110. Display 110 may be configured to display information to users of computing device 100. In particular embodiments, display 110 may be a touchscreen configured to receive user input through tactile touch. As an example, and not by way of limitation, a user may select an item displayed on display 110 by touching display 110 relative to the location of the displayed item. As another example, and not by way of limitation, the user may scroll up or down by swiping up or down on display 110. In some embodiments, display 110 may be configured to generate a haptic signal to the user. As an example and not by way of limitation, display 110 may be configured, according to well-known techniques, to present a texture to a user. For example, display 110 may be configured to feel rough and grainy like sandpaper when the user touches display 110. Although this disclosure describes display 110 performing various functions, this disclosure contemplates display 110 performing any suitable functions.

Computing device 100 may include a trackball 120. In particular embodiments, trackball 120 may be configured to navigate selections on display 110. In some embodiments, a user of computing device 100 may use trackball 120 to make selections displayed on display 110. Computing device 100 may further include a plurality of buttons 130. In particular embodiments, buttons 130 may be pressed by a user of computing device 100 to perform various functions. As an example, and not by way of limitation, buttons 130 may be pressed to power on and power off computing device 100. As another example, and not by way of limitation, buttons 130 may be pressed to initiate or to end telephone calls. In particular embodiments, buttons 130 may be located on the side of computing device 100. Computing device 100 may further include a keyboard 140 configured to enter user input. In particular embodiments, keyboard 140 may include a plurality of buttons 130. In some embodiments, buttons 130 on keyboard 140 may include alphanumeric characters.

Computing device 100 may be configured to receive calls or messages 150. In particular embodiments, calls or messages 150 may be sent to computing device 100 wirelessly. In some embodiments, call or message 150 may be a telephone call, an email message, a text message, an SMS message, or any other suitable call or message received at computing device 100.

In particular embodiments, computing device 100 may be configured to lock and unlock. When unlocked, a user of computing device 100 may be able to perform various functions on computing device 100. When locked, a user may be able to perform only a restricted set of functions on computing device 100. In particular embodiments, a user may unlock computing device 100 by entering in a code comprising alphanumeric characters. In other embodiments, a user may unlock computing device 100 by entering a gesture pattern. A gesture pattern may include a particular movement of the user's finger over display 110. In particular embodiments, computing device 100 may further include an internal motor to generate vibrations.

According to the teachings of the disclosure, computing device 100 provides better security for its features and data. For example, there may be people and devices around a user attempting to steal a code to unlock computing device 100 when the user is entering the code. The user may wish to unlock computing device 100 without letting other people know how to unlock computing device 100 simply by watching the user unlock computing device 100. In these situations, computing device 100 may allow the user to unlock computing device 100 without letting other people know how to unlock computing device 100 by associating a particular haptic signal with one of a plurality of codes that can unlock computing device 100, presenting the haptic signal to the user, and then unlocking computing device 100 upon receiving the code associated with the particular haptic signal. The haptic signal may be perceived only by the user. In particular embodiments, the user may press a button 130 to request to unlock computing device 100. Computing device 100 may select a code from a stored plurality of codes and generate a corresponding haptic signal associated with the selected code. The user may perceive the haptic signal and enter a code that matches the selected code. The haptic signal may be perceived only by the user and not by any other person. On a subsequent request to unlock, computing device 100 may select a different code and generate the haptic signal associated with that code. By using computing device 100, a user may be relatively certain that if a person were to steal a code by watching the user unlock computing device 100, the person would not be able to unlock computing device 100 because the person did not perceive the haptic signal associated with the code.

Figure 1B:
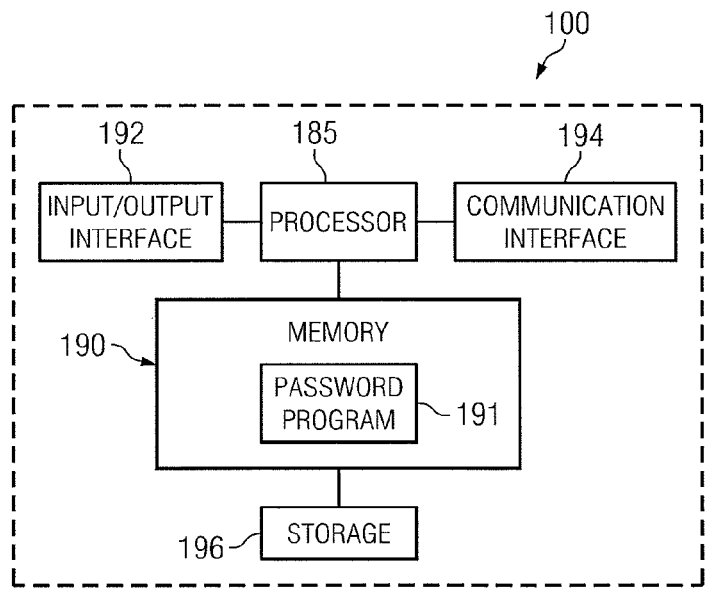
FIG. 1B is a functional block diagram of the computing device of FIG. 1A, illustrating a physical implementation configured to execute software.
Figure 2:
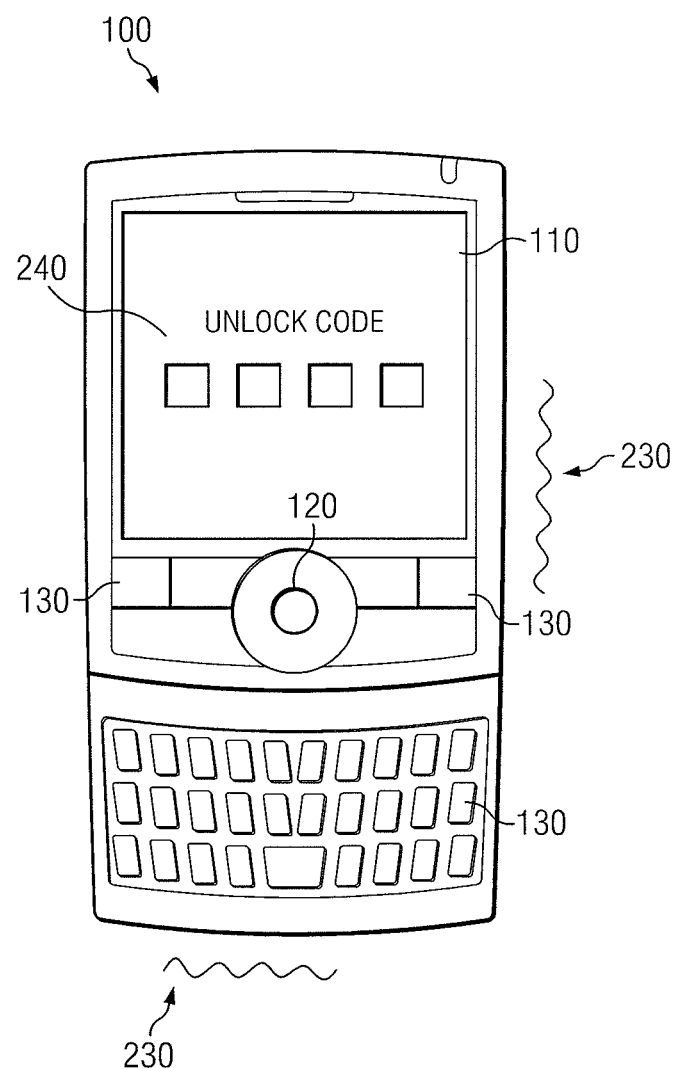
FIG. 2 is a schematic diagram of the computing device of FIG. 1A showing generation of a haptic signal associated with a code to unlock the computing device.
Figure 3:
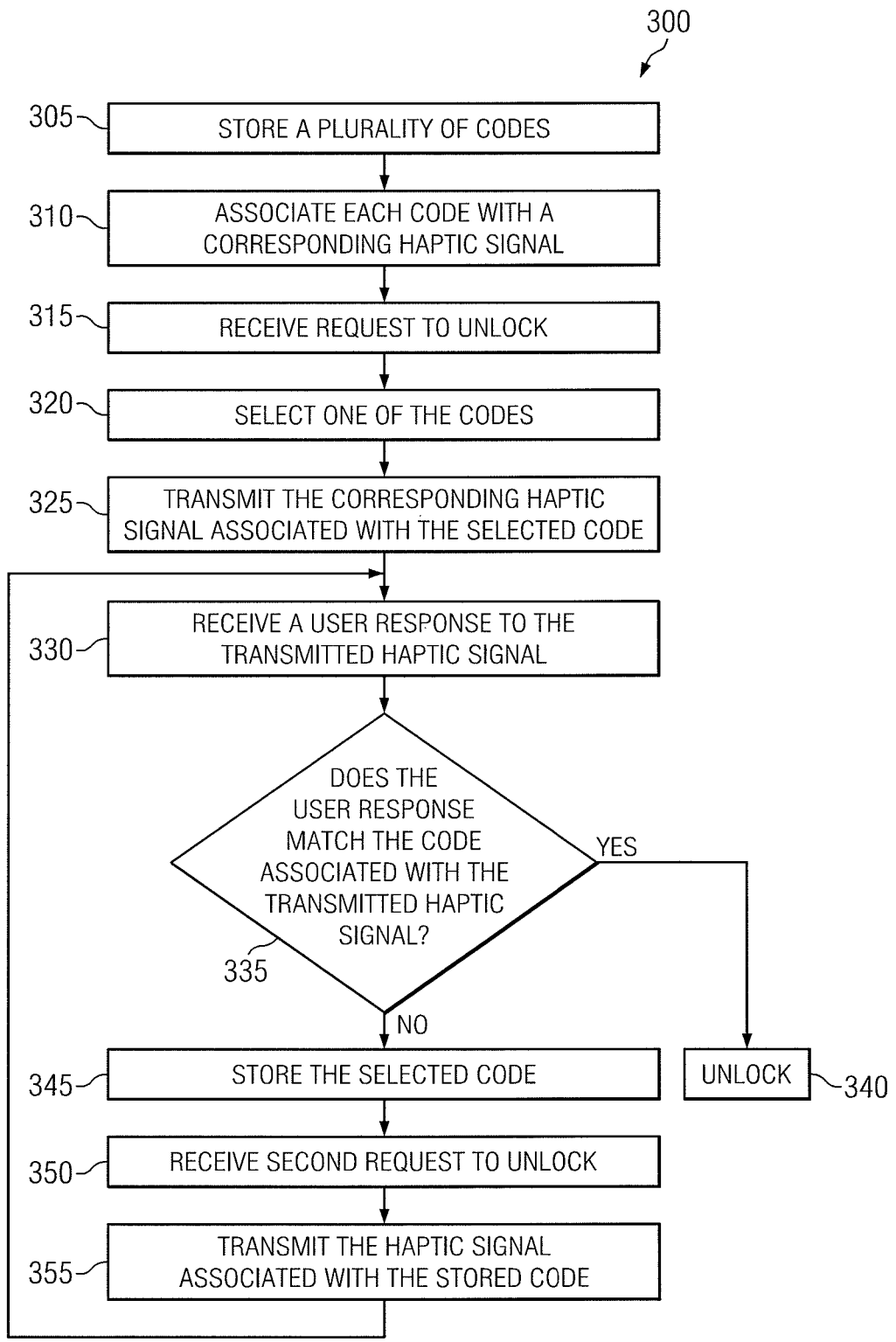
FIG. 3 is a flowchart illustrating a method of associating codes to unlock the computing device of FIG. 1A with corresponding haptic signals.

FIGS. 1B-3 describe particular embodiments of the present invention. FIG. 1B describes a physical implementation of computing device 100 configured to execute software. FIG. 2 describes computing device 100 associating a corresponding haptic signal with a code to unlock computing device 100. FIG. 3 describes a method executed by computing device 100 to associate haptic signals with codes to unlock computing device 100.

FIG. 1B illustrates a physical implementation of the computing device of FIG. 1A configured to execute software. As provided in FIG. 1B, computing device 100 may include a processor 185, a memory 190, a storage 196, an Input/Output (I/O) interface 192, and a communication interface 194. In particular embodiments, computing device 100 and its components may be implemented in hardware, for example, an ASIC.

In particular embodiments, memory 190 may be configured to store a plurality of codes to unlock computing device 100. In particular embodiments, processor 185 may be operable to associate each code in the plurality of codes with a corresponding haptic signal, and to generate the corresponding haptic signal for a selected code in response to a request to unlock computing device 100. In particular embodiments, I/O interface 192 and communication interface 194 may be configured to provide communication between computing device 100 and a user and another network respectively.

Computing device 100 may include a processor 185. In particular embodiments, processor 185 may include hardware for executing instructions, such as those making up a computer program. As an example and not by way of limitation, to execute instructions, processor 185 may retrieve (or fetch) the instructions from an internal register, an internal cache, memory 190, or storage 196; decode and execute them; and then write one or more results to an internal register, an internal cache, memory 190, or storage 196.

In particular embodiments, processor 185 may be configured to associate each code in a plurality of stored codes with a corresponding haptic signal. As an example and not by way of limitation, processor 185 may associate each code with a corresponding vibration. As another example and not by way of limitation, processor 185 may associate each code with a corresponding texture.

In particular embodiments, processor 185 may be configured to receive a request to unlock computing device 100. As an example and not by way of limitation, processor 185 may be configured to sense a push of a button on computing device 100 indicating a request to unlock. As another example and not by way of limitation, processor 185 may be configured to sense a touch on a display of computing device 100 indicating a request to unlock. As yet another example and not by way of limitation, processor 185 may be configured to sense a shake of computing device 100 indicating a request to unlock. Although this disclosures describes computing device 100 receiving a request to unlock in particular ways, this disclosure contemplates computing device 100 receiving a request to unlock in any suitable way.

In particular embodiments, processor 185 may be configured to select a code from the plurality of codes, and to generate the corresponding haptic signal associated with the selected code. As an example and not by way of limitation, processor 185 may select a code from the plurality of codes. The selected code may have an intense vibration associated with it. Processor 185 may be configured to generate the intense vibration so that a user who perceives the intense vibration may know to enter the selected code. As another example and not by way of limitation, the selected code may have a particular texture associated with it. Processor 185 may be configured to generate the particular texture on a display of computing device 100 so that a user who perceives the particular texture may know to enter the selected code.

In particular embodiments, memory 190 includes main memory for storing instructions for processor 185 to execute or data for processor 185 to operate on. As an example, and not by way of limitation, memory 190 may store password program 191 configured, when executed by processor 185, to store codes to unlock computing device 100. Password program 191 may further be configured, when executed by processor 185, to unlock computing device 100 when a received user response matches a selected code. In particular embodiments, storage 196 includes mass storage for data or instructions. As an example and not by way of limitation, storage 196 may include removable or non-removable (or fixed) media, where appropriate.

In particular embodiments, memory 190 may be configured to store a plurality of codes. As an example and not by way of embodiment, memory 190 may be configured to store a plurality of alphanumeric sequences. As another example and not by way of limitation, memory 190 may be configured to store a plurality of gesture patterns. In particular embodiments, the plurality of codes may include codes to unlock computing device 100.

In particular embodiments, I/O interface 192 includes hardware, software, or both providing one or more interfaces for communication between computing device 100 and a user. Computing device 100 may include one or more of these I/O devices, where appropriate. As an example and not by way of limitation, an I/O device may include a keyboard 140, touchscreen, microphone, display 110, speaker, camera, trackball 120, video camera, another suitable I/O device or a combination of two or more of these. In particular embodiments, I/O interface 192 may be configured to receive requests for particular properties of calls or messages.

In particular embodiments, communication interface 194 includes hardware, software, or both providing one or more interfaces for communication (such as, for example, packet-based communication) between computing device 100 and one or more other computing devices 100 or one or more networks. As an example and not by way of limitation, communication interface 194 may include an antenna or a wireless NIC. This disclosure contemplates any suitable network and any suitable communication interface 194 for it. As an example and not by way of limitation, computing device 100 may communicate with an ad hoc network, a personal area network (PAN), a local area network (LAN), a wide area network (WAN), a metropolitan area network (MAN), or one or more portions of the Internet or a combination of two or more of these. As an example, computing device 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computing device 100 may include any suitable communication interface 194 for any of these networks, where appropriate. Communication interface 194 may include one or more communication interfaces 194, where appropriate. Although this disclosure describes and illustrates a particular communication interface, this disclosure contemplates any suitable communication interface.

FIG. 2 is a schematic diagram of computing device 100 of FIG. 1A generating a haptic signal associated with a code to unlock the computing device. In particular embodiments, a user may request to unlock computing device 100 when there are people or other devices attempting to steal the unlock code by watching the user's actions. In this situation, computing device 100 may select a code from a stored plurality of codes. Computing device 100 may then generate a corresponding haptic signal associated with the selected code that only the user may perceive. The user may then enter the corresponding code associated with the generated haptic signal. Computing device 100 may display a request for an unlock code 240 on display 110 as the user enters the code. In this manner, people or other devices may steal the code when the user enters it into computing device 100, but they will not be able to steal the associated haptic signal. If another person or device subsequently attempts to unlock computing device 100, they may be unsuccessful because computing device 100 may select another code from the stored plurality of codes, which is associated with a different haptic signal.

In particular embodiments, a user may request to unlock computing device 100. Unlocking computing device 100 may allow the user to perform certain functions with computing device 100, such as, for example, making a phone call, sending an email, sending a text message, or any other suitable function. As an example and not by way of limitation, the user may request to unlock computing device 100 by pressing a button 130. As another example and not by way of limitation, a user may request to unlock computing device 100 by scrolling or pressing trackball 120.

In particular embodiments, in response to the request to unlock, computing device 100 may select a code from a stored plurality of codes. Each code may have a corresponding haptic signal associated with it. For example, and not by way of limitation, a first code may be associated with an intense vibration 230 and a second code may be associated with a light vibration 230. As another example, and not by way of limitation, a first code may be associated with a smooth texture and a second code may be associated with a rough texture. Computing device 100 may generate and transmit the corresponding haptic signal associated with the selected code. As an example and not by way of limitation, after selecting a code, computing device 100 may generate a vibration 230 such that the user may be the only person to perceive the vibration 230. As another example and not by way of limitation, computing device 100 may generate a particular texture on display 110 such that the user is the only person to perceive the texture.

In particular embodiments, the user may enter the corresponding code associated with the generated haptic signal. As an example and not by way of limitation, the user may enter the code by pressing a plurality of buttons 130. As another example and not by way of limitation, the user may enter the code by entering a gesture pattern on display 110. A gesture pattern may be a particular movement over a grid display.

In particular embodiments, computing device 100 may display a request for an unlock code 240 on display 110. As an example and not by way of limitation, computing device 100 may display a sequence of boxes to indicate the unlock code 240 is an alphanumeric code. As another example and not by way of limitation, computing device 100 may display a grid to indicate the unlock code 240 is a gesture pattern. The user may respond to the request for an unlock code 240 by entering a code. In particular embodiments, computing device 100 may display the code as the user enters it on display 110. In other embodiments, computing device 100 may hide or cover the code on display 110 as it is entered.

FIG. 3 is a flowchart illustrating a method of associating codes to unlock the computing device of FIG. 1A with corresponding haptic signals. Many of the steps of the illustrated method may be performed by a software program stored in a memory of the computing. As illustrated in FIG. 3, method 300 begins at step 305 where a computing device stores a plurality of codes. In particular embodiments, the plurality of codes may include a plurality of sequences of alphanumeric characters. In other embodiments, the plurality of codes may include a plurality of gesture patterns. At step 310 the computing device associates each code with a corresponding haptic signal. In particular embodiments, the corresponding haptic signal may be a vibration. In other embodiments, the corresponding haptic signal may be a texture. At step 315 the computing device receives a request to unlock the computing device. As an example and not by way of limitation, the computing device may receive the request to unlock by receiving a touch on display 110. As another example and not by way of limitation, the computing device may receive the request to unlock by receiving a push of a button 130. As yet another example and not by way of limitation, the computing device may receive the request to unlock by receiving a shake. At step 320 the computing device may select one of the codes in the plurality of codes. At step 325 the computing device may generate the corresponding haptic signal associated with the selected code.

At step 330 the computing device may receive a user response to the generated haptic signal. At step 335 the computing device determines whether the user response matches the code associated with the generated haptic signal. If the user response matches the code associated with the transmitted haptic signal, then method 300 proceeds to step 340 where the computing device unlocks. If the user response does not match the code associated with the generated haptic signal, then method 300 proceeds to step 345 where the computing device stores the selected code. At step 350 the computing device may receive a second request to unlock the computing device. At step 355 the computing device may generate the haptic signal associated with the stored code. Method 300 may then proceed to step 330.

In particular embodiments, method 300 may provide better security for the stored codes. As an example and not by way of limitation, the computing device may generate the corresponding haptic signal associated with the selected code at step 325 to only the user of the computing device. The user may then generate the user response received at step 330. Even if a person other than the user were to witness the user response, the person would not be able to tell what the haptic signal generated in step 325 was because only the user would be able to perceive the generated haptic signal. As another example and not by way of limitation, if the computing device determines the user response does not match the code associated with the generated haptic signal in step 335, the computing device may transmit the same haptic signal on subsequent attempts to unlock. In this manner, the computing device may be secured against unauthorized users who may know some, but not all of the stored codes.

Although the present invention has been described above in connection with several embodiments, changes, substitutions, variations, alterations, transformations, and modifications, may be suggest that to one skilled in the art and it is intended that the present invention encompass such changes, substitutions, variations, alterations, transformations, and modifications as fall within the spirit and scope of the appended claims.

What is claimed is:

1. A mobile communication device comprising:
   a memory operable to store a plurality of codes;
   a processor;
   logic storing computer instructions configured, when executed on the processor, to:
      associate each code with a corresponding vibration;
      receive a push of a button on the mobile communication device indicating a request to unlock the mobile communication device;
      select one of the plurality of codes;
      generate the corresponding vibration associated with the selected code;
      receive a user response to a generated vibration; and
      determine that the user response matches the selected code and in response, unlock the mobile communication device.

2. A method comprising:
   storing a plurality of codes in a mobile computing device;
   associating, by the mobile computing device, each code with a corresponding vibration;
   receiving, at the mobile computing device, a request to unlock the mobile computing device;
   selecting, by the mobile computing device, one of the plurality of codes; and
   generating, by the mobile computing device, the corresponding vibration associated with the selected code.

3. The method of claim 2, further comprising:
   receiving, at the mobile computing device, a user response to the generated vibration; and
   determine that the user response matches the selected code and in response, unlock the mobile computing device.

4. The method of claim 2, wherein storing the plurality of codes comprises storing a plurality of a sequence of characters.

5. The method of claim 2, wherein storing the plurality of codes comprises storing a plurality of gesture patterns.

6. The method of claim 2, wherein receiving the request comprises receiving a touch on a display of the mobile computing device.

7. The method of claim 2, wherein receiving the request comprises receiving a push of a button on the mobile computing device.

8. The method of claim 2, wherein receiving the request comprises receiving a shake of the mobile computing device.

9. A method comprising:
   storing a plurality of codes in a mobile computing device;
   associating, by the mobile computing device, each code with a corresponding haptic signal;
   receiving, at the mobile computing device, a request to unlock the mobile computing device;
   selecting, by the mobile computing device, one of the plurality of codes;
   generating, by the mobile computing device, the corresponding haptic signal associated with the selected code;
   receiving, at the mobile computing device, a user response to the generated haptic signal, the user response does not match the code associated with the generated haptic signal;
   storing the selected code in the mobile computing device;
   receiving, at the mobile computing device, a second request to unlock the mobile computing device; and
   generating, by the mobile computing device, the haptic signal associated with the stored code.

10. A method comprising:
    storing a plurality of codes in a mobile computing device;
    associating, by the mobile computing device, each code with a corresponding haptic signal;
    receiving, at the mobile computing device, a request to unlock the mobile computing device;
    selecting, by the mobile computing device, one of the plurality of codes; and
    generating, by the mobile computing device, the corresponding haptic signal associated with the selected code, wherein generating the haptic signal comprises generating a vibration.

11. A method comprising:
    storing a plurality of codes in a mobile computing device;
    associating, by the mobile computing device, each code with a corresponding texture;
    receiving, at the mobile computing device, a request to unlock the mobile computing device;
    selecting, by the mobile computing device, one of the plurality of codes; and
    generating, by the mobile computing device, the corresponding texture associated with the selected code, wherein:
       the corresponding texture is presented on a display of the mobile computing device; and
       the corresponding texture feels rough when touched.

12. A computing device comprising:
    a memory operable to store a plurality of codes;
    a processor operable to:
       associate each code with a corresponding vibration
       receive a request to unlock the computing device;
       select one of the plurality of codes; and
       generate the corresponding vibration associated with the selected code.

13. The computing device of claim 12, wherein the processor is further operable to:
    receive a user response to the generated vibration; and determine that the user response matches the selected code and in response, unlock the computing device.

14. The computing device of claim 12, wherein the memory is operable to store a plurality of a sequence of characters.

15. The computing device of claim 12, wherein the memory is operable to store a plurality of gesture patterns.

16. The computing device of claim 12, wherein the processor is operable to receive a request by receiving a touch on a display of the computing device.

17. The computing device of claim 12, wherein the processor is operable to receive a request by receiving a push of a button on the computing device.

18. The computing device of claim 12, wherein the processor is operable to receive a request by receiving a shake of the computing device.

19. The computing device of claim 12, wherein the computing device is a mobile computing device.

20. A computing device comprising:
a memory operable to store a plurality of codes; and
a processor operable to:
associate each code with a corresponding haptic signal;
receive a request to unlock the computing device;
select one of the plurality of codes; and
generate the corresponding haptic signal associated with the selected code;
receive a user response to the generated haptic signal, the user response does not match the code associated with the generated haptic signal;
store the selected code in the memory;
receive a second request to unlock the computing device;
select the stored code; and
generate the corresponding haptic signal associated with the stored code.

21. A computing device comprising:
a memory operable to store a plurality of codes; and
a processor operable to:
associate each code with a corresponding haptic signal;
receive a request to unlock the computing device;
select one of the plurality of codes;
generate the corresponding haptic signal associated with the selected code; and
generate a vibration.

22. A computing device comprising:
a memory operable to store a plurality of codes;
a processor operable to:
associate each code with a corresponding texture;
receive a request to unlock the computing device;
select one of the plurality of codes; and
generate the corresponding texture associated with the selected code, wherein:
the corresponding texture is presented on a display of the mobile computing device; and
the corresponding texture feels rough when touched.

* * * * *